United States Patent
Sager et al.

(10) Patent No.: US 12,188,397 B2
(45) Date of Patent: Jan. 7, 2025

(54) SYSTEM AND METHOD TO MONITOR COATED RADIATOR

(71) Applicant: FCA US LLC, Auburn Hills, MI (US)

(72) Inventors: Roger C Sager, Munith, MI (US); Steven C Wante, Lakeland, MI (US); Aurora J White, Ypsilanti, MI (US); Robert L Roy, Rochester Hills, MI (US); Daniel E Hornback, Oakland, MI (US); Matthew T Bartlett, Northville, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 17/947,462

(22) Filed: Sep. 19, 2022

(65) Prior Publication Data
US 2024/0093634 A1    Mar. 21, 2024

(51) Int. Cl.
*F01P 11/14*    (2006.01)
*B60K 11/08*    (2006.01)

(52) U.S. Cl.
CPC ............ *F01P 11/14* (2013.01); *B60K 11/085* (2013.01); *F01P 2025/08* (2013.01)

(58) Field of Classification Search
CPC ............................... F01P 11/14; B60K 11/085
See application file for complete search history.

(56) References Cited

U.S. PATENT DOCUMENTS

| | | | |
|---|---|---|---|
| 6,212,882 B1 * | 4/2001 | Greger | B01D 53/944 423/247 |
| 6,681,619 B2 | 1/2004 | Alleving et al. | |
| 6,695,473 B2 | 2/2004 | Unger et al. | |
| 7,567,884 B2 | 7/2009 | Busch et al. | |
| 8,171,779 B2 | 5/2012 | Prinz et al. | |
| 10,258,968 B2 * | 4/2019 | Buelow | B01J 35/615 |
| 2005/0100492 A1 * | 5/2005 | Hoke | B01D 53/02 423/247 |
| 2006/0078464 A1 | 4/2006 | Alleving et al. | |
| 2014/0013953 A1 * | 1/2014 | Sugimoto | B01D 53/66 96/110 |
| 2015/0007731 A1 * | 1/2015 | Shinoda | B01D 53/0462 96/111 |

FOREIGN PATENT DOCUMENTS

| | | |
|---|---|---|
| DE | 102004015044 | 4/2012 |
| EP | 1416133 A1 | 5/2004 |

* cited by examiner

Primary Examiner — Long T Tran
(74) Attorney, Agent, or Firm — Jeremy J. Klobucar

(57) ABSTRACT

A vehicle includes a component coated with a pollutant reduction catalyst configured to remove pollutants from a flow of air over the component, a catalyst temperature sensor coupled to the component, a general temperature sensor, a vehicle speed sensor, and an active grille shutter (AGS) system having a plurality of movable grille shutters. A controller is configured to determine an efficiency of the pollutant reduction catalyst based on signals from the catalyst temperature sensor, the general temperature sensor, the vehicle speed sensor, and the AGS system.

18 Claims, 2 Drawing Sheets

SYSTEM AND METHOD TO MONITOR COATED RADIATOR

FIELD

The present application relates generally to vehicle components coated with a pollutant reduction catalyst and, more particularly, to a system to monitor the presence and efficiency of a pollutant reduction catalyst coated component.

BACKGROUND

Due to regulatory requirements, some vehicle components are coated with pollutant reduction catalysts to reduce environmental contaminants. For example, a vehicle radiator can be coated with a Direct Ozone Reduction (DOR) catalyst, which utilizes the heat of the radiator to convert ozone ($O_3$) in the air into oxygen ($O_2$). In order to obtain regulatory credits for such coatings, the vehicles are often required to include a diagnostic system to ensure the coated radiator, as opposed to a radiator without the catalyst coating, is installed on the vehicle. However, such conventional diagnostic systems are unable to determine the efficiency or remaining useful life of the coating, which capabilities may provide additional regulatory credits. Thus, while such systems do work well for their intended purpose, it is desirable to provide continuous improvement in the relevant art.

SUMMARY

According to one example aspect of the invention, a vehicle is provided. In one exemplary implementation, the vehicle includes a component coated with a pollutant reduction catalyst configured to remove pollutants from a flow of air over the component, a catalyst temperature sensor coupled to the component, a general temperature sensor, a vehicle speed sensor, and an active grille shutter (AGS) system having a plurality of movable grille shutters. A controller is configured to determine an efficiency of the pollutant reduction catalyst based on signals from the catalyst temperature sensor, the general temperature sensor, the vehicle speed sensor, and the AGS system.

In addition to the foregoing, the described vehicle may include one or more of the following features: wherein the controller is configured to determine a remaining useful life of the pollutant reduction catalyst based on the determined efficiency; wherein the controller is configured to determine the efficiency of the pollutant reduction catalyst by determining an airflow through the component based on signals from the vehicle speed sensor and the AGS system, and a frontal area for a grille of the vehicle, and multiplying the determined airflow by an efficiency factor of the pollutant reduction catalyst; and wherein the controller is configured to determine a presence of the pollutant reduction catalyst coating based on a signal from the catalyst temperature sensor.

In addition to the foregoing, the described vehicle may include one or more of the following features: wherein the controller is configured to determine an absence of the pollutant reduction catalyst coating based on the absence of a signal from the catalyst temperature sensor; wherein the catalyst temperature sensor includes a sealed housing, and wherein tampering with the catalyst temperature sensor is configured to destroy the sealed housing and cause a detectable leak in the component or an associated coolant system; wherein the component is disposed in an engine compartment of the vehicle; wherein the component is a vehicle radiator; and wherein the general temperature sensor is configured to sense an engine coolant temperature.

According to another example aspect of the invention, a method of monitoring a vehicle having a component coated with a pollutant reduction catalyst configured to remove pollutants from a flow of air over the component, a catalyst temperature sensor coupled to the component, a general temperature sensor, a vehicle speed sensor, and an active grille shutter (AGS) system having a plurality of movable grille shutters is provided. The method includes, in one exemplary implementation, monitoring, with a controller, signals from the catalyst temperature sensor, the general temperature sensor, the vehicle speed sensor, and the AGS system, and determining, with the controller, an efficiency of the pollutant reduction catalyst based on the signals from the catalyst temperature sensor, the general temperature sensor, the vehicle speed sensor, and the AGS system.

In addition to the foregoing, the described method may include one or more of the following features: determining, via the controller, a remaining useful life of the pollutant reduction catalyst based on the determined efficiency; wherein determining the efficiency includes determining, via the controller, an airflow through the component based on signals from the vehicle speed sensor and the AGS system, and a frontal area for a grille of the vehicle, and multiplying the determined airflow by an efficiency factor of the pollutant reduction catalyst; determining, via the controller, a presence of the pollutant reduction catalyst coating based on a signal from the catalyst temperature sensor.

In addition to the foregoing, the described method may include one or more of the following features: determining, via the controller, an absence of the pollutant reduction catalyst coating based on the absence of a signal from the catalyst temperature sensor; wherein the catalyst temperature sensor includes a sealed housing, and wherein tampering with the catalyst temperature sensor is configured to destroy the sealed housing and cause a detectable leak in the component or an associated coolant system; wherein the component is a radiator disposed in an engine compartment of the vehicle; and wherein the general temperature sensor is configured to sense an engine coolant temperature.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

The present application is generally directed to a system and method for monitoring a pollutant reduction catalyst coated onto a vehicle component. Although not limited thereto, in the example embodiment, the pollutant reduction catalyst is a Direct Ozone Reduction (DOR) catalyst coating applied to a vehicle radiator. The system utilizes a catalyst temperature sensor welded into a radiator housing. Any tampering with the catalyst temperature sensor is configured to destroy the seal for the housing and thus cause a detectable leak in the radiator or associated system (e.g., engine coolant system). Further, if an uncoated radiator is installed into the vehicle, there is no sensor available to provide a signal to a communication network or bus that the sensor is present. Thus, the system monitors and confirms a properly installed and DOR coated radiator.

In this way, the temperature sensor can be utilized in a comparison at a cold start with a general vehicle temperature sensor, for example, a coolant temperature sensor. A profile matching of the current coolant temperature sensor is compared to the catalyst temperature sensor with a hysteresis from the current temperature and taking into account variability of coolant temperatures and location. Should the temperature be within the hysteresis and match a nominal warmup profile, then the sensor is deemed good and the radiator is accepted as nominal/passing proper installation.

Additionally, the system is configured to determine a conversion efficiency of the pollutant reduction catalyst. The system utilizes one or more inputs including vehicle speed, grill shutter position, ambient temperature, radiator surface temperature, and vehicle frontal area (e.g., air that passes through the radiator). Flow of air through the radiator is calculated and multiplied by an efficiency factor of the coating (e.g., a surface lookup based on temperature and flow). The data is then accumulated and compared to the remaining useful lifetime of the radiator (a base value that is based on known data about the particular pollutant reduction catalyst).

Figure 1:
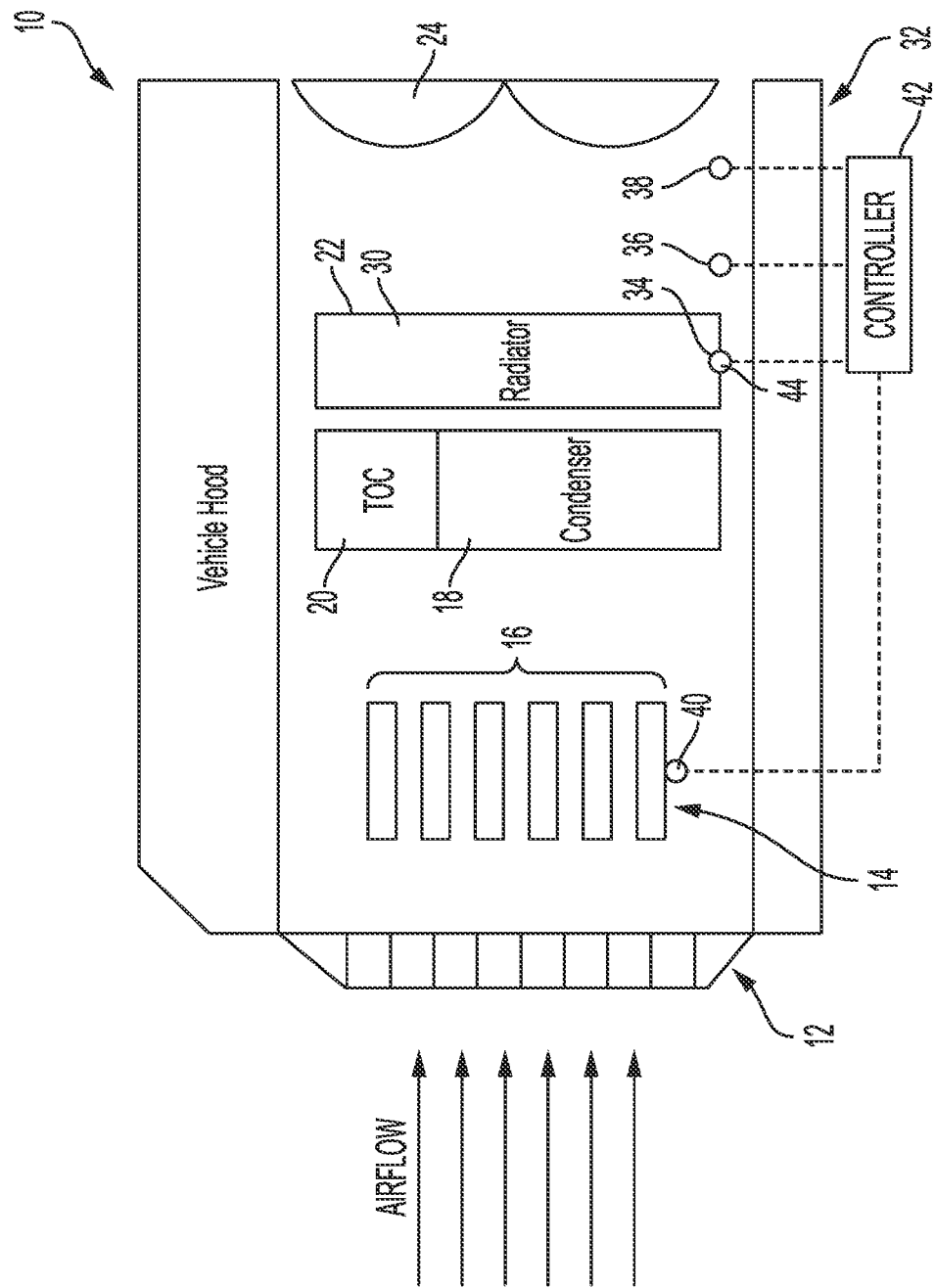
FIG. 1 is a schematic illustration of a vehicle with a pollutant reduction catalyst monitoring system in accordance with the principles of the present disclosure.

With initial reference to FIG. 1, a portion of an example vehicle is schematically illustrated and generally identified at reference numeral 10. In the example embodiment, the vehicle 10 generally includes a grille 12, an active grille shutter (AGS) system 14 with a plurality of individually movable shutters 16, an air conditioner condenser 18, a transmission oil cooler 20, a radiator 22, and a radiator fan 24. As described herein in more detail, one or more components are coated with a pollutant reduction catalyst 30 configured to reduce or remove a pollutant from ambient air. In the example embodiment, the pollutant reduction catalyst 30 is a direct ozone reduction (DOR) catalyst configured to convert ozone ($O_3$) in the air into oxygen ($O_2$) utilizing heat from the coated component. However, it will be appreciated that various types of pollutant reduction catalysts may be utilized with the system described herein. Moreover, in the example embodiment, the catalyst 30 is coated onto the radiator 22, though it will be appreciated that the catalyst coating may be utilized on various other components, such as the condenser 18.

In the example implementation, the vehicle 10 further includes a pollutant reduction catalyst monitoring system 32. As illustrated, the catalyst monitoring system 32 generally includes a catalyst temperature sensor 34, a general vehicle temperature sensor 36, a vehicle speed sensor 38, and a grille shutter position sensor 40 all in signal communication with a controller 42. The catalyst temperature sensor 34 includes a housing 44 permanently fixed to the coated component, such as the radiator 22. Any tampering with the catalyst temperature sensor 34 will destroy the seal for the housing 44 and cause a detectable leak in the radiator or associated system. The general temperature sensor 36 is, for example, configured to sense an engine coolant temperature of the vehicle 10. The vehicle speed sensor 38 is configured to detect a speed of vehicle 10 (e.g., accelerometer), and the grille shutter position sensor 40 is configured to sense a position of the shutters 16 between a fully open position and a fully closed position.

Figure 2:
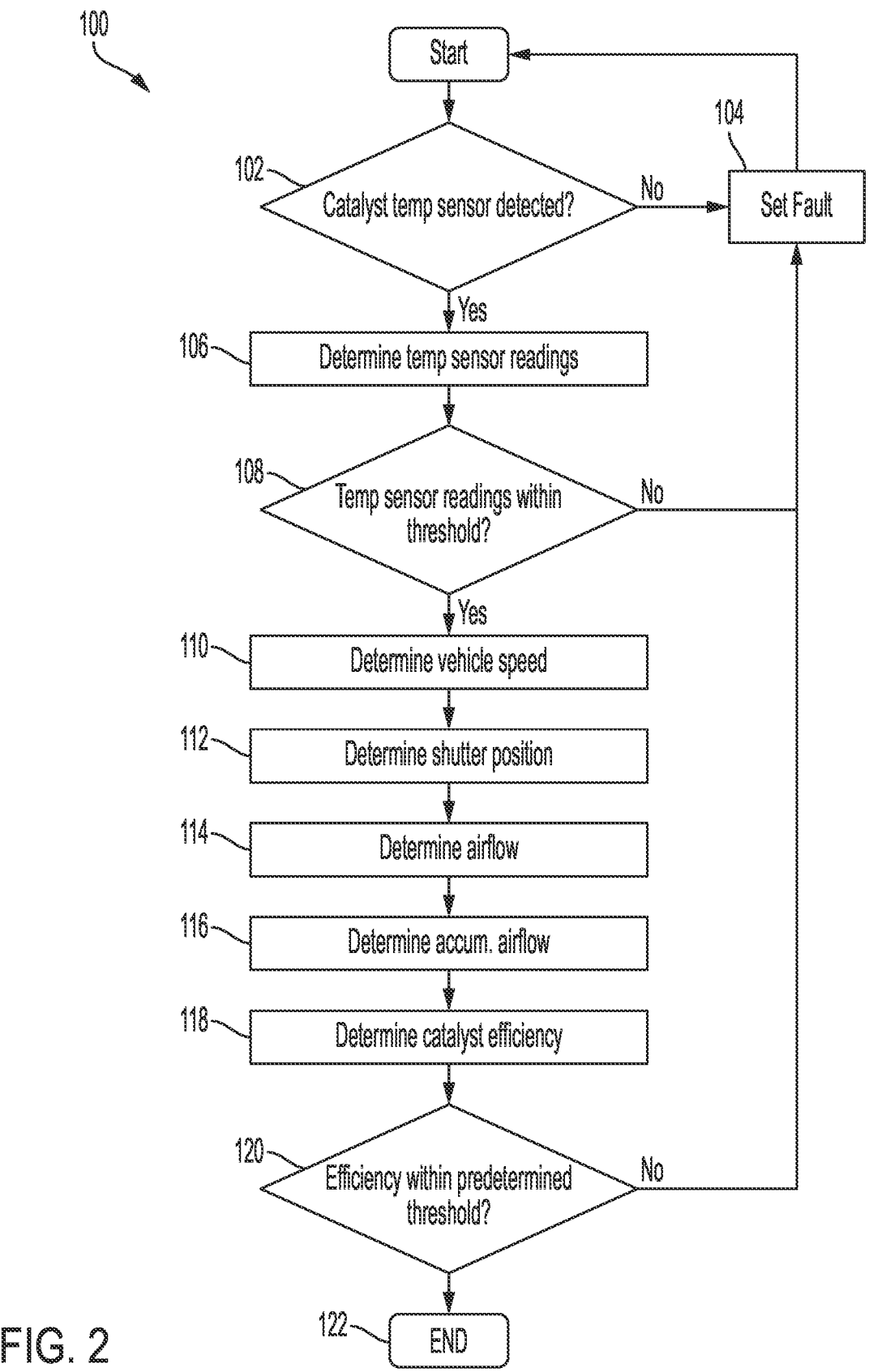
FIG. 2 illustrates an example pollutant reduction catalyst monitoring control method in accordance with the principles of the present disclosure.

Referring now to FIG. 2, a flow diagram of a pollutant reduction catalyst monitor control method 100 according to the principles of the present disclosure is illustrated. At 102, the pollutant reduction catalyst monitoring system 32 including controller 42 determines if the catalyst temperature sensor 34 is detected. If no, at step 104, monitoring system 32 sets a diagnostic fault and returns to step 102. If yes, at step 106, controller 42 determines temperature readings at the catalyst temperature sensor 34 and the general temperature sensor 36. At step 108, controller 42 determines if a difference between the temperature readings is within a predetermined threshold. In this way, controller 42 validates the integrity of the catalyst temperature sensor 34 against the general temperature sensor 36 by comparing both sensors' temperature vs. time characteristic, for example at startup (warmup profile), and hysteresis to ensure both sensors give relatively similar results. If not within the predetermined threshold, control proceeds to step 104. If within the predetermined threshold, control proceeds to step 110.

At step 110, controller 42 determines a speed of vehicle 10 via the vehicle speed sensor 38. At step 112, controller 42 determines a grille shutter position via the grille shutter position sensor 40. At step 114, controller 42 determines an airflow into the engine compartment 44 based on the determined vehicle speed, determined grille shutter position, and a known frontal area of the vehicle for the grille 12 (e.g., the area for air to flow into the engine compartment). For example, the airflow can be calculated by a lookup table or calculated real time via governing physical equations.

At step 116, controller 42 determines an accumulated airflow through the radiator based on the airflow determined in step 114. One example determination utilizes CFD data to create a grid of volume flow rate at shutter positions, vehicle speed and fan speed, and interpolates at all different combinations. Another example utilizes adjusted air flow models to obtain multiple air flow equations at different shutter positions. Each equation would have inputs for fan input current and vehicle speed and that calculates air flow for that shutter position. When shutter position changes, the equation is changed accordingly. At step 118, controller 42 utilizes the determined accumulated airflow (step 114) and the temperature readings (step 106) to correlate and calculate an efficiency of the DOR coating on the radiator 22. At step 120, controller 42 determines if the calculated efficiency (or remaining useful life) is within a predetermined threshold. If no, control proceeds to step 104. If yes, control then ends at step 122 and may return to step 102 for another cycle.

Described herein are systems and methods for monitoring a pollutant reduction catalyst coated on a vehicle component such as a vehicle radiator. The system utilizes a pollutant catalyst temperature sensor coupled directly to the vehicle component to validate the presence of the coated component. The system then utilizes signals from the catalyst temperature sensor, a general temperature sensor, a vehicle speed sensor, a grille shutter position sensor, and a lookup table to calculate the flow of air through the radiator. The flow is then multiplied by an efficiency factor of the coating and then accumulated and compared to the remaining useful lifetime of the radiator to determine an efficiency of the coating.

It will be appreciated that the term "controller" as used herein refers to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It should be understood that the mixing and matching of features, elements and/or functions between various examples may be expressly contemplated herein so that one skilled in the art would appreciate from the present teachings that features, elements and/or functions of one example may be incorporated into another example as appropriate, unless described otherwise above.

What is claimed is:

1. A vehicle, comprising:
   a component coated with a pollutant reduction catalyst configured to remove pollutants from a flow of air over the component;
   a catalyst temperature sensor coupled to the component;
   a general temperature sensor;
   a vehicle speed sensor;
   an active grille shutter (AGS) system having a plurality of movable grille shutters; and
   a controller configured to determine an efficiency of the pollutant reduction catalyst based on signals from the catalyst temperature sensor, the general temperature sensor, the vehicle speed sensor, and the AGS system,
   wherein the catalyst temperature sensor includes a sealed housing permanently fixed to the coated component, wherein a presence or absence of a signal from the catalyst temperature sensor to the controller indicates a presence or absence of the coated component and thus the pollutant reduction catalyst, to thereby facilitate confirming the presence of the coated component for diagnostic purposes.

2. The vehicle of claim 1, wherein the controller is configured to determine a remaining useful life of the pollutant reduction catalyst based on the determined efficiency.

3. The vehicle of claim 1, wherein the controller is configured to determine the efficiency of the pollutant reduction catalyst by:
   determining an airflow through the component based on (i) a vehicle speed signal from the vehicle speed sensor, (ii) a grille shutter position of the movable grille shutters of the AGS system, and (iii) a known frontal area for a grille of the vehicle; and
   multiplying the determined airflow by an efficiency factor of the pollutant reduction catalyst.

4. The vehicle of claim 1, wherein the catalyst temperature sensor sealed housing is permanently fixed to the coated component such that removal or tampering with the catalyst temperature sensor is configured to destroy the sealed housing and cause a detectable leak in the component or an associated coolant system, thereby indicating the coated component and pollutant reduction catalyst may be compromised or absent.

5. The vehicle of claim 1, wherein the component is disposed in an engine compartment of the vehicle.

6. The vehicle of claim 1, wherein the component is a vehicle radiator.

7. The vehicle of claim 1, wherein the general temperature sensor is configured to sense an engine coolant temperature.

8. A method of monitoring a vehicle having a component coated with a pollutant reduction catalyst configured to remove pollutants from a flow of air over the component, a catalyst temperature sensor coupled to the component, a general temperature sensor, a vehicle speed sensor, and an active grille shutter (AGS) system having a plurality of movable grille shutters, the method comprising:
   monitoring, with a controller, signals from the catalyst temperature sensor, the general temperature sensor, the vehicle speed sensor, and the AGS system; and
   determining, with the controller, an efficiency of the pollutant reduction catalyst based on the signals from the catalyst temperature sensor, the general temperature sensor, the vehicle speed sensor, and the AGS system,
   wherein determining the efficiency includes:
      determining, via the controller, an airflow through the component based on signals from the vehicle speed sensor and the AGS system, and a frontal area for a grille of the vehicle; and
      multiplying the determined airflow by an efficiency factor of the pollutant reduction catalyst.

9. The method of claim 8, further comprising determining, via the controller, a remaining useful life of the pollutant reduction catalyst based on the determined efficiency.

10. The method of claim 8,
   further comprising:
   determining, by the controller, an accumulated airflow through the coated component based on the determined airflow; and
   determining, by the controller, the efficiency based on the determined accumulated airflow and temperature readings from the catalyst temperature sensor and the general temperature sensor.

11. The method of claim 8, further comprising determining, via the controller, a presence of the pollutant reduction catalyst coating based on a signal from the catalyst temperature sensor.

12. The method of claim 8, further comprising determining, via the controller, an absence of the pollutant reduction catalyst coating based on the absence of a signal from the catalyst temperature sensor.

13. The method of claim 8, wherein the catalyst temperature sensor includes a sealed housing permanently fixed to the coated component, the method further comprising:
   detecting, by the controller, a leak when the catalyst temperature sensor is tampered with, thereby indicating the coated component and pollutant reduction catalyst may be compromised or absent.

14. The method of claim 8, wherein the component is a radiator disposed in an engine compartment of the vehicle.

15. The method of claim 8, wherein the general temperature sensor is configured to sense an engine coolant temperature.

16. The method of claim 8, further comprising:
   determining, by the controller, if the coated component and catalyst temperature sensor are properly installed by determining if a temperature detected by the catalyst temperature sensor is within a predetermined threshold of a temperature detected by the general temperature sensor.

17. A vehicle, comprising:
a component coated with a pollutant reduction catalyst configured to remove pollutants from a flow of air over the component;
a catalyst temperature sensor coupled to the component;
a general temperature sensor;
a vehicle speed sensor;
an active grille shutter (AGS) system having a plurality of movable grille shutters; and
a controller configured to determine an efficiency of the pollutant reduction catalyst based on signals from the catalyst temperature sensor, the general temperature sensor, the vehicle speed sensor, and the AGS system,
wherein the controller is configured to determine the efficiency of the pollutant reduction catalyst by:
determining an airflow through the component based on (i) a vehicle speed determined from the vehicle speed sensor, (ii) a grille shutter position of the movable grille shutters, and (iii) a known frontal area for a grille of the vehicle; and
multiplying the determined airflow by an efficiency factor of the pollutant reduction catalyst.

18. The vehicle of claim 17, wherein the controller is further configured to:
determine if the coated component and catalyst temperature sensor are properly installed by determining if a temperature detected by the catalyst temperature sensor is within a predetermined threshold of a temperature detected by the general temperature sensor.

* * * * *